L. C. FREEMAN.
TRANSMISSION MECHANISM FOR AUTOMOBILES.
APPLICATION FILED MAR. 19, 1913.

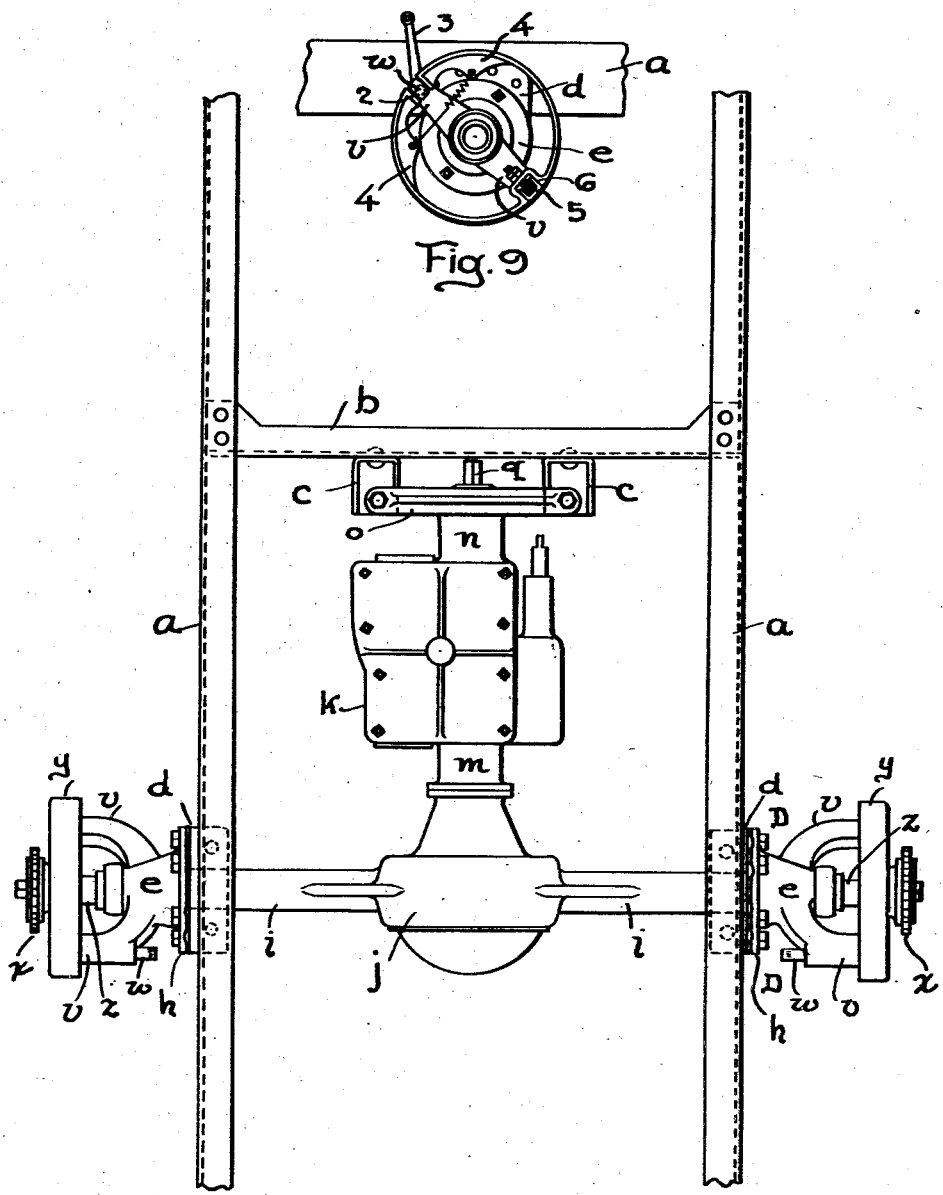

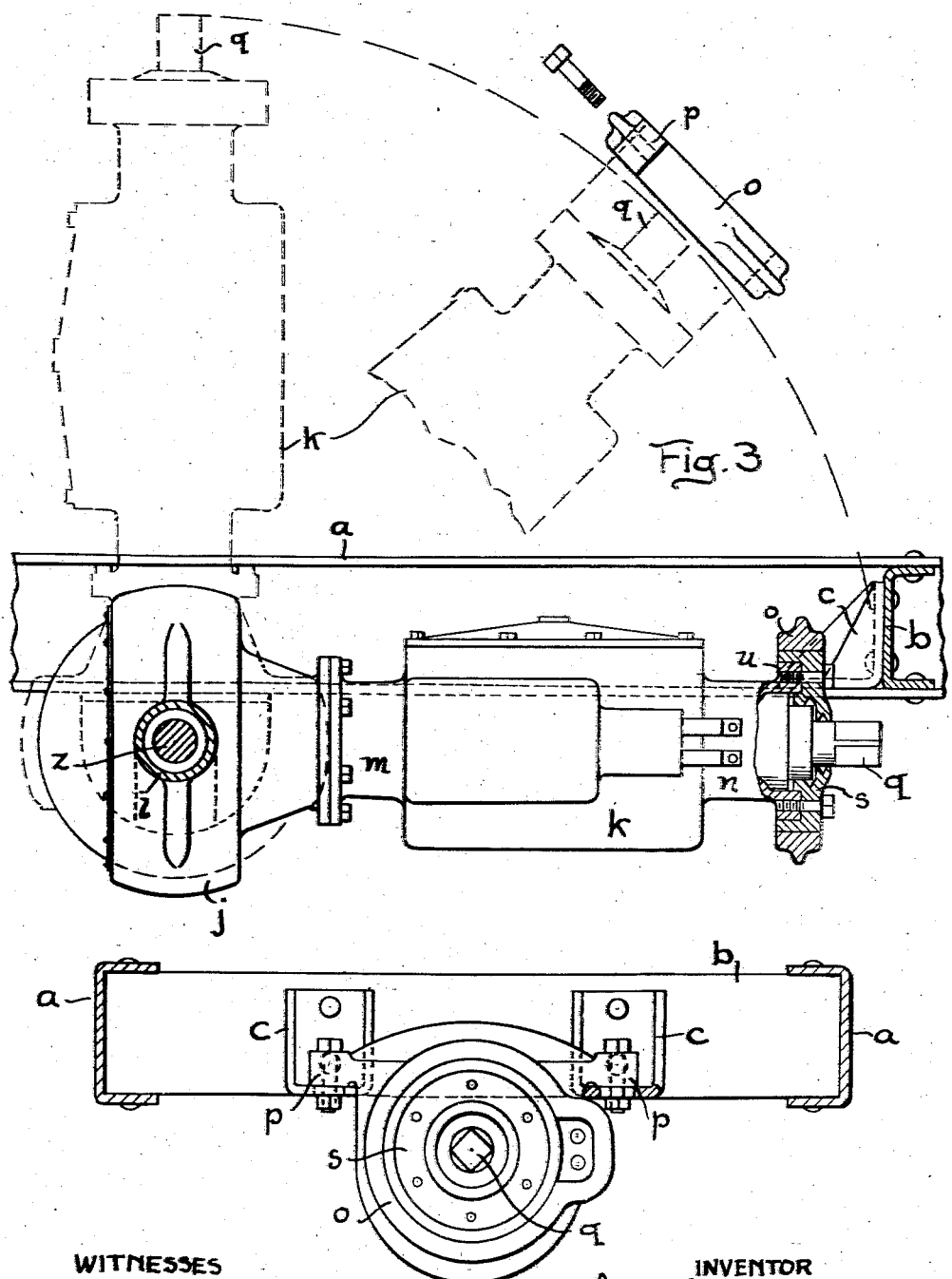

1,223,333.

Patented Apr. 17, 1917.
4 SHEETS—SHEET 3.

WITNESSES

INVENTOR
Lowell C. Freeman
BY
Ralzemond A. Parker
ATTORNEY

UNITED STATES PATENT OFFICE.

LOWELL C. FREEMAN, OF DETROIT, MICHIGAN.

TRANSMISSION MECHANISM FOR AUTOMOBILES.

1,223,333. Specification of Letters Patent. Patented Apr. 17, 1917.

Application filed March 19, 1913. Serial No. 755,379.

*To all whom it may concern:*

Be it known that I, LOWELL C. FREEMAN, a citizen of the United States, residing at Detroit, county of Wayne, State of Michigan, have invented a certain new and useful Improvement in Transmission Mechanism for Automobiles, and declare the following to be a full, clear, and exact description of the same, such as will enable others skilled in the art to which it pertains to make and use the same, reference being had to the accompanying drawings, which form a part of this specification.

My invention relates to transmission mechanism for automobiles and an object of my improvements is to provide an improved construction and mode of attachment of the transmission mechanism in an automobile using a counter shaft.

I secure this object in the device illustrated in the accompanying drawings, in which, Figure 1, is a plan view of the chassis of an automobile adjacent to the counter shaft and transmission gear, and an apparatus embodying my invention secured to said chassis.

Fig. 2, is an elevation looking from the part of Fig. 1 which is toward the top of the sheet.

Fig. 3, is a side elevation of the same partly in section, the side pieces of the chassis toward the observer being removed.

Figure 6:
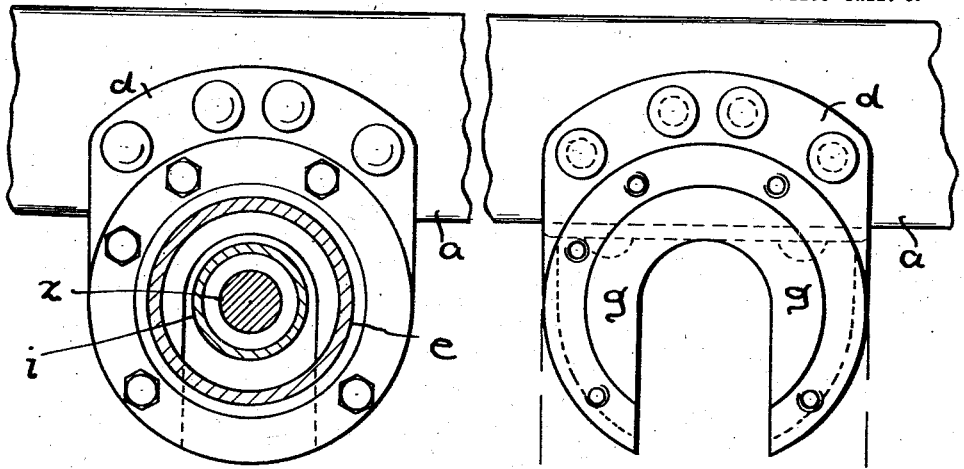
Fig. 6, is a view similar to Fig. 4, except that the parts shown in Fig. 4 are in this figure not assembled. The section in Figs. 4 and 6 is taken on the line D—D Fig. 1.

Fig. 9, (Sheet 1) is a sectional elevation of the bearing bracket looking from the side of the vehicle, the brake drum being removed.

$a$, $a$ are the side pieces of an automobile frame. $b$ is a cross piece. $c$, $c$ are lugs extending from the cross pieces $b$, $b$ between the side pieces $a$, $a$. $d$, $d$ are securing plates, one of which is riveted to the outside of each of the side pieces $a$, $a$. $e$, $e$ are bearing brackets adapted to be secured to the plates $d$, $d$ as hereinafter described.

$j$, is a casing for equalizing gear, and $i$, $i$ are the usual tubular extensions of said casing. The extensions $i$, $i$ bear in the brackets $e$, $e$ so as to be capable of turning therein. $z$, $z$ is the counter shaft, which is adapted to turn in bearings supported by the extensions $i$, $i$. $x$, $x$ are sprocket gear wheels on the ends of the counter shaft $z$, $z$. The attaching plates $d$, $d$ are forked, the space between the forks opening downward, and are countersunk in cylindrical form concentric with the upper part of the space between the forks, as indicated at $g$. The bearing brackets $e$, $e$ are provided with cylindrical projections $h$, $h$ adapted to fit into the countersunk portions $g$, $g$ of the attaching plates $d$, $d$. The extensions $i$, $i$ from the casing $j$ pass between the forks of the attaching plates $d$, $d$ and fit into the upper portion of the opening between said forks. The cylindrical projections $h$, $h$ are then moved inward and fit into the countersunk portions $g$, $g$ of the attaching plates $d$, $d$ and the brackets are secured to said attaching plates by bolts extending through the flanges of the same.

$v$, $v$ are two arms, or branches, extending from the bearing brackets $e$, $e$. 4 (Fig. 9) is a split ring having a socket 6 fitting over a lug 5 on the end of one of the branches or arms $v$, $v$. $w$, is a cam shaft adapted to be operated by an arm 3 by which the cam 2 is rotated to expand the ring 4 to set the brake. $y$, $y$ are drums secured to the counter shaft $z$, $z$ and extending over the split ring or brake shoes 4—4.

$k$, is the casing for the change-speed gearing. This casing is provided with a tubular extension $m$ which is adapted to be bolted to an extending part of the casing $j$. $n$ is a tubular extension coaxial with the extension $m$ and upon the opposite side of the casing $k$. $o$ is an annulus adapted to embrace the expanded end of the tubular extension $n$. The annulus $o$ is provided with opposite laterally extending lugs $p$, $p$ which are secured by bolts to the lugs $c$, $c$.

$q$, is the power shaft leading in to the transmission gearing and adapted to be coupled by a universal joint to the motor, (not shown). By referring to Fig. 3 it will be seen that there is provided an additional annulus s which is bolted to the expanded end u of the extension n, which may be machined and finished at its periphery to fit to the machined inner wall of the annulus o. The annulus s may be provided with oil grooves and afford a bearing for the shaft q, or support for a bearing therefor.

Figure 4:
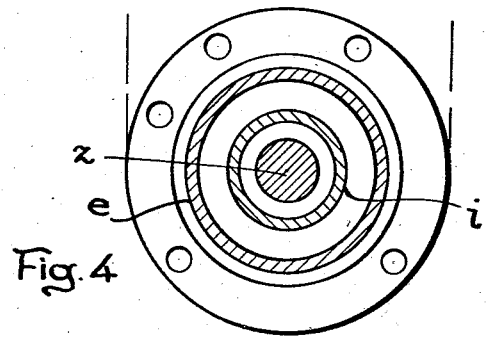
Fig. 4, is a detail sectional view showing the parts separated.
Figure 5:
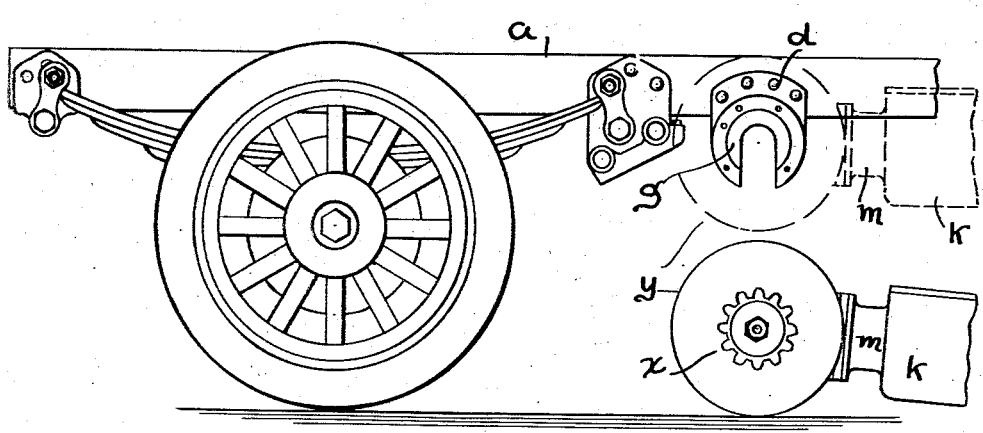
Fig. 5, is a side elevation of a part of an automobile embodying my invention, the counter shaft and attached mechanism being removed.
Figure 8:
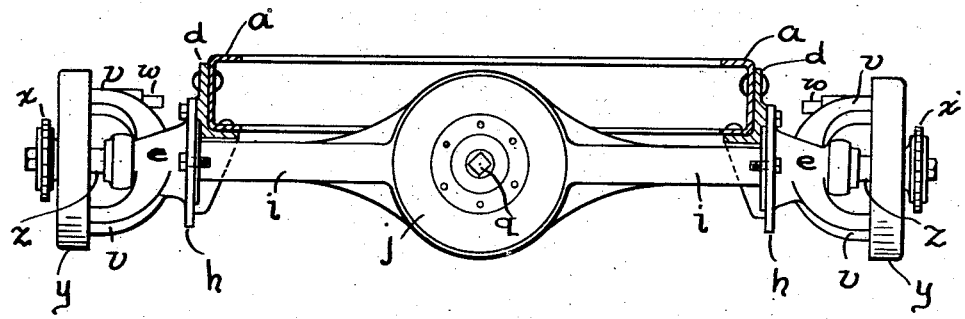
Fig. 8, is a view similar to Fig. 7, except that the parts are shown assembled.
Figure 7:
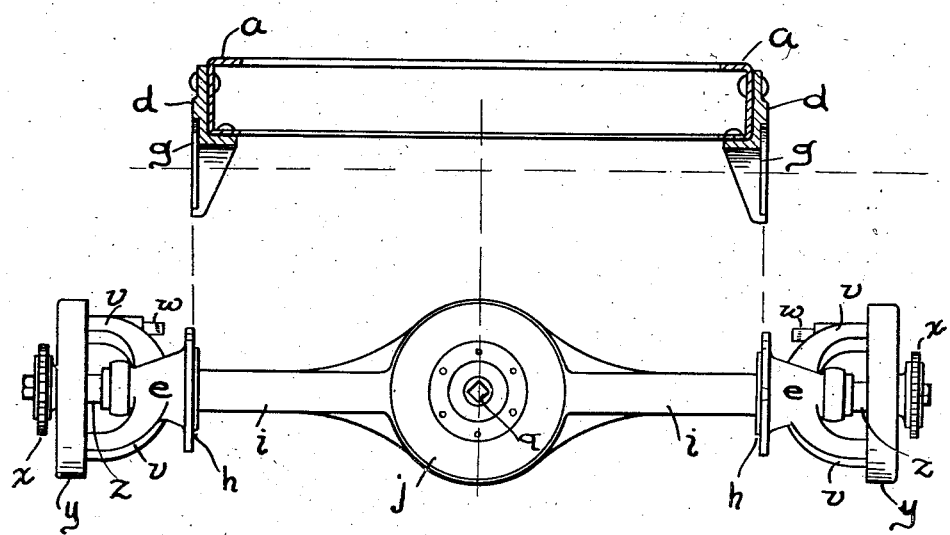
Fig. 7, is an end elevation partly in section showing the counter shaft as a whole removed from the chassis. This figure is substantially an elevation of the part shown in Fig. 5 looking from the right of the latter, the wheels and springs being removed.

The ring s being separable may be easily machined and accurately shaped. By removing the bolts securing the annulus o to the lugs c, c the change-speed gearing may be turned upward, as shown in Fig. 3, the tubular extension i turning in their bearings in the bracket e, e thus the various parts are rendered more easily accessible. The equalizing gear casing j and its extensions i, i with the bearing bracket e, e may be readily removed by removing the securing bolts in said brackets and dropping the casing and attached parts down, as shown in Figs. 4, 5 and 7.

What I claim is:—

1. In an automobile, the combination of a casing for the equalizing gear, laterally extending parts from said casing adapted to turn in bearings on said frame, a change-speed gear casing secured to said equalizing gear casing and extending at right angles thereto, an annulus surrounding said change-speed gear casing at a point remote from the equalizing gear casing so as to form a loose joint therewith, and means for detachably securing said annulus to the frame.

2. In an automobile, the combination of a casing for the equalizing gear, laterally extending parts from said casing adapted to turn in bearings on said frame, a change-speed gear casing secured to said equalizing gear casing and extending at right angles thereto, an annulus surrounding a portion of said change-speed gear casing remote from the equalizing gear casing, a cross piece forming part of said frame, lugs extending from said cross piece, lugs extending from said annulus and adapted to be removably secured upon the first mentioned lugs.

3. In an automobile, a frame, attaching pieces secured to said frame, said attaching pieces being countersunk in their outer surfaces, bearing brackets having projections adapted to fit into said countersunk portions of the attaching plates, bearings in said brackets, a counter shaft resting in said bearings, and means for securing said brackets to said attaching pieces.

4. In an automobile having a frame, attaching plates having forks opening downward from said frame, an equalizing gear casing having laterally extending portions adapted to fit in the openings of said forks, bearing brackets, said extensions of the equalizing gear casing bearing in said brackets, a counter shaft bearing in said equalizing gear casing, and means for detachably securing said brackets to the sides of said attaching plates.

5. In an automobile, the combination of a frame, a casing for the equalizing gear, laterally extending parts from said casing adapted to turn in bearings on said frame, a change-speed gear casing secured to said equalizing gear casing and extending at right angles thereto and means for detachably securing said gear casing to the frame so as to permit relative angular motion of said change gear casing, said bearings being removable in a direction approximately at right angles to said frame.

6. In an automobile, a frame, attaching pieces secured to said frame, said attaching pieces being countersunk at their outer surfaces, bearing brackets having projections adapted to fit into said countersunk portions of the attaching plates, bearings in said brackets, a counter shaft resting in said bearings and means for securing said brackets to said attaching pieces, said attaching pieces being provided with forks opening downward and being countersunk around the upper end of the openings of said forks.

In testimony whereof I sign this specification in the presence of two witnesses.

LOWELL C. FREEMAN.

Witnesses:
VIRGINIA C. SPRATT,
ELLIOTT J. STODDARD.